June 1, 1965  M. L. ANTHONY  3,187,123
BINARY KEY IDENTIFIER FOR MACHINE TOOLS
Filed April 3, 1961  4 Sheets-Sheet 1

INVENTOR.
MYRON L. ANTHONY
BY
Wallace, Kinzer & Horn
ATTYS.

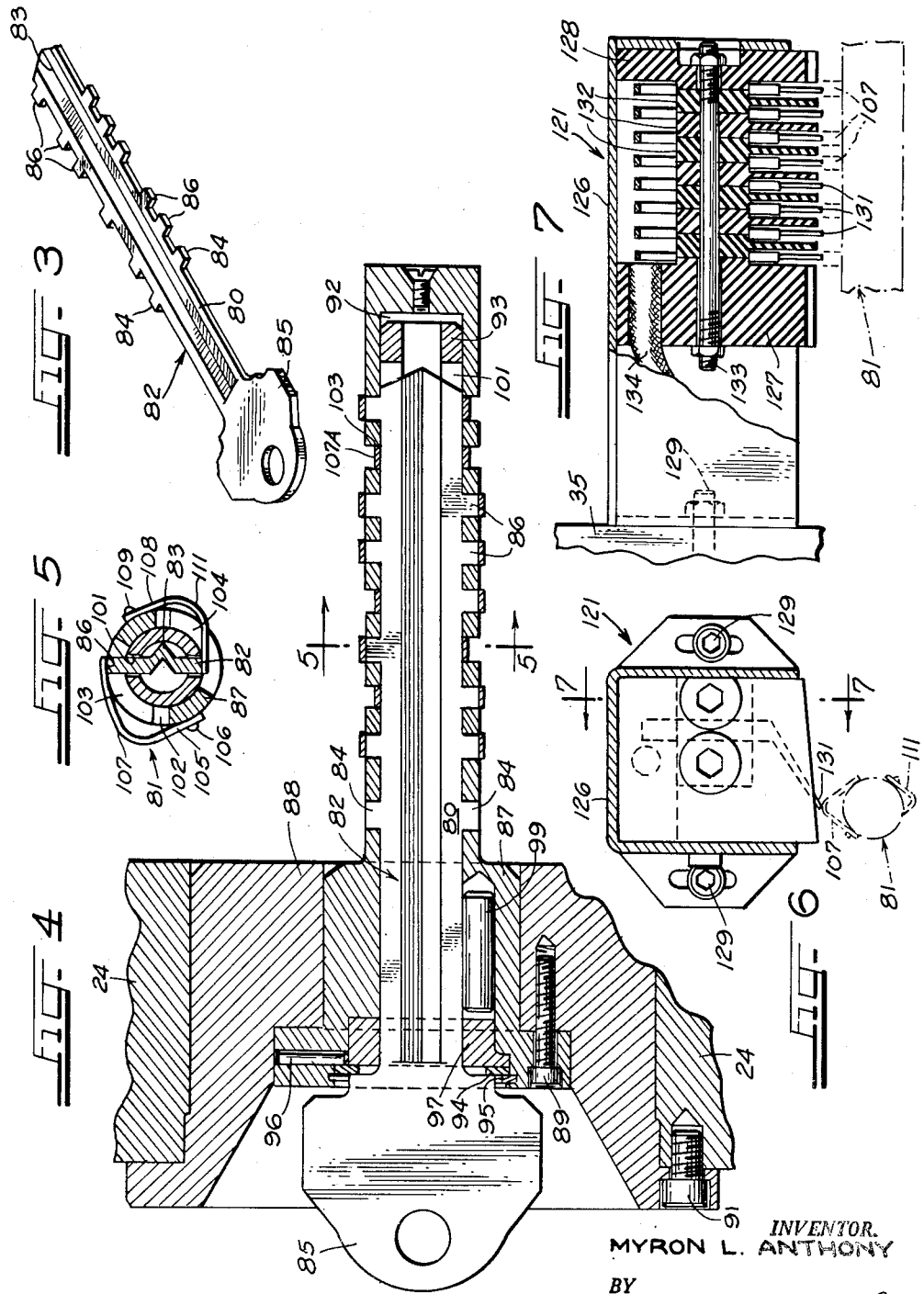

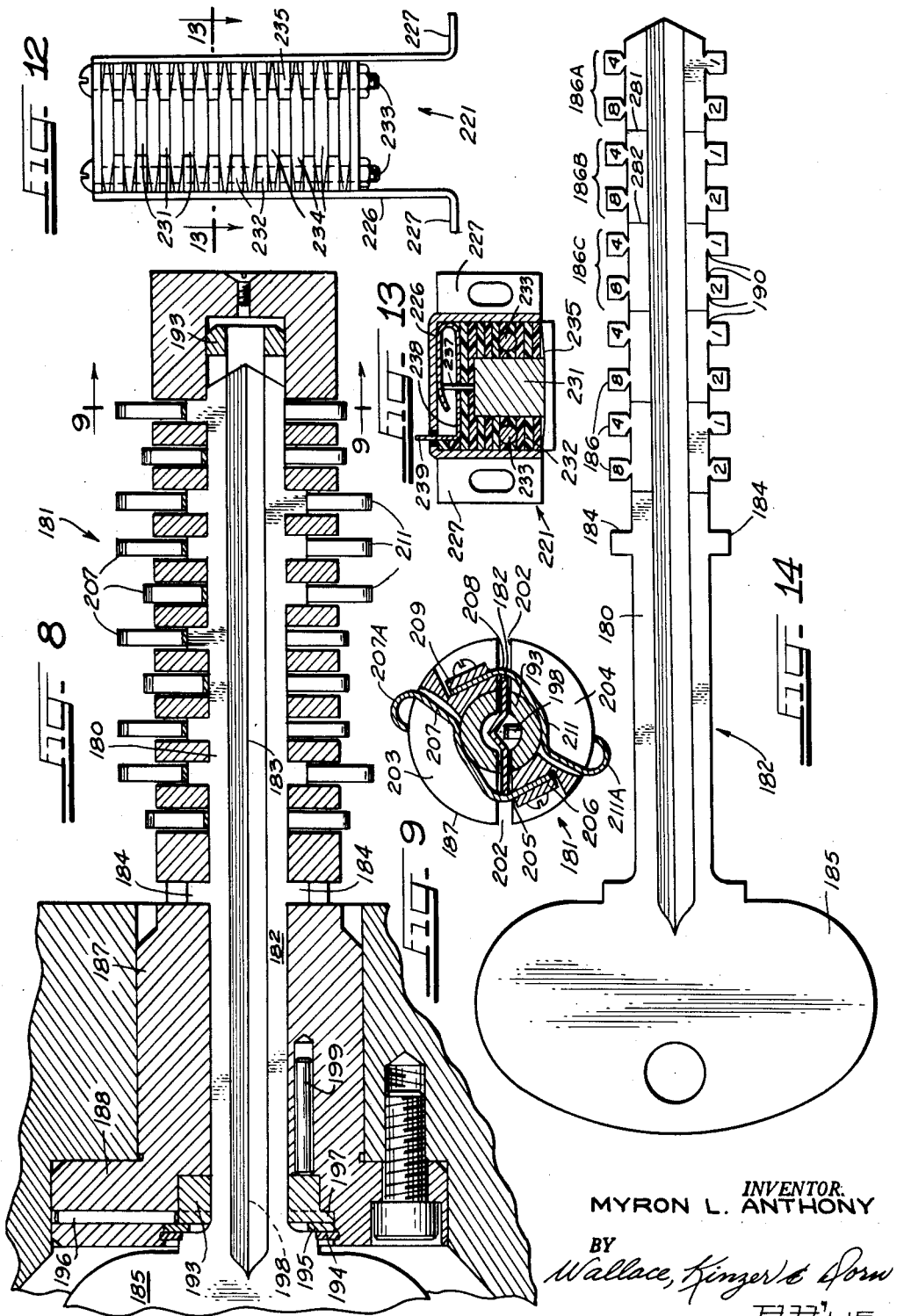

June 1, 1965  M. L. ANTHONY  3,187,123
BINARY KEY IDENTIFIER FOR MACHINE TOOLS
Filed April 3, 1961  4 Sheets-Sheet 4
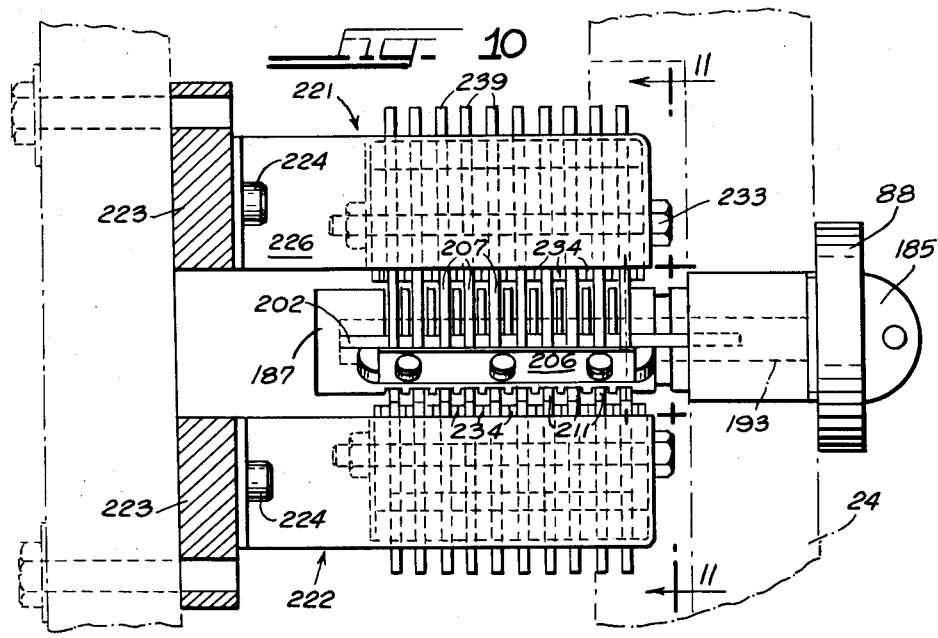
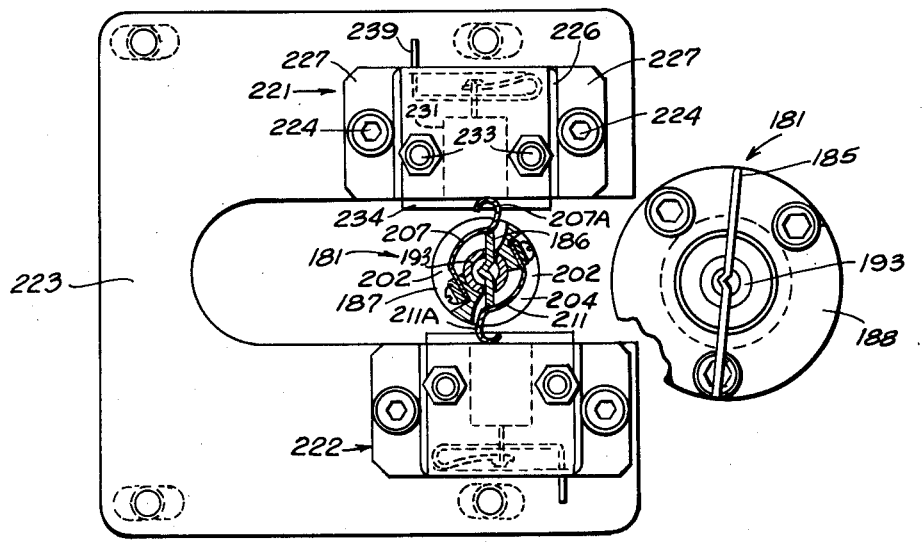
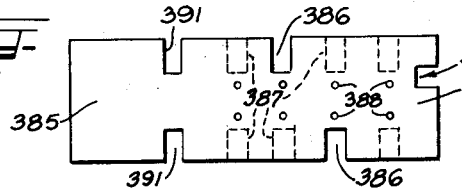
INVENTOR.
MYRON L. ANTHONY
BY
Wallace, Kinzer & Dorn
ATT'YS.

United States Patent Office 3,187,123
Patented June 1, 1965

3,187,123
BINARY KEY IDENTIFIER FOR MACHINE TOOLS
Myron L. Anthony, La Grange, Ill., assignor to Scully-Anthony Corporation, La Grange, Ill., a corporation of Illinois
Filed Apr. 3, 1961, Ser. No. 100,349
5 Claims. (Cl. 200—44)

This invention relates to a new and improved tool transfer system for machine tools, and particularly to new and improved coded identification devices and code sensing apparatus for tool transfer systems.

Increasing emphasis upon automation of machine tool operations has resulted in the development of several systems for controlling the transfer of individual tools, in a machine tool, from a storage station to a work station and back to the storage station. One such system provides for programming and control in accordance with the physical location of the individual tools in a tool matrix. Tools are removed from the matrix in a predetermined order, tool identification being based upon the tool position in the matrix. Another system used heretofore provides for random storage of individually coded tools in a tool matrix or storage station. This system is more sophisticated than the position-code system and results in more flexible machine operation. In this system, each tool or toolholder is directly encoded with data identifying the tool, and means are provided to enable the machine to recognize and locate the desired tool independently of its position in the tool matrix. The tool changing cycle may be relatively simple because it is only necessary to interchange the tool at the work station with the next required tool in the matrix. An improved data control system for machine tools utilizes a plurality of individual code members each bearing code indicia identifying an individual tool. Means are provided for removably mounting the individual code members at a tool storage station in association with the respective tools that they identify. The system includes sensing means for sensing the code indicia on the code members at the storage station; control means, coupled to the sensing means, are employed to actuate the tool transfer means to transfer preselected tools from the storage station to the work station and back to the storage station. This control means includes means for storing data identifying the tool while it is separated from its code member, thereby enabling the control means to restore each tool to a position, in the storage station, in which it is associated with the correct code member. This system is described in detail in the co-pending application of Myron L. Anthony, Serial No. 79,272, filed December 29, 1960.

It is a principal object of the present invention to provide a new and improved code member that may be utilized as an identification device for identifying individual tools, in a machine tool transfer system.

A further object of the invention is to provide effective and convenient means for encoding a code key utilized as a code member in a tool transfer system without requiring the use of elaborate or expensive encoding equipment.

Thus, in accordance with one aspect of the present invention, there is provided a code member used in a tool identification system for a machine tool. This code member comprises a key, preferably of metal, having a handle portion and an elongated shank portion. A plurality of code lugs of substantially equal length project outwardly of the shank portion at predetermined spaced code locations along the shank, coding being effected by removal of selected lugs. In a preferred embodiment described in detail hereinafter, indicia are stamped or otherwise impressed in the key to divide the code lugs into manageable groups and to identify the code significance of the lugs. Guide means may also be provided to align the key in a data transfer device.

Another important object of the present invention is to provide a new and improved key receptacle and data transfer device for presenting code data to a sensing unit in accordance with the presence or absence of code lugs on a code key as described hereinabove.

Another object of the invention is to afford a code key receptacle and data transfer device that is inherently self-protecting with respect to some kinds of distortion of individual code transfer elements included therein.

Accordingly, in another aspect the invention is directed to a code key receptacle and data transfer device for use in a tool identification system for a machine tool. This device comprises an elongated cylindrical housing having a plurality of radial lug-receiving openings at predetermined spaced code locations along the housing. A cylindrical tumbler is mounted within the housing and is rotatable between a key insertion position and a data transfer position; this tumbler is provided with a key-receiving slot that extends longitudinally thereof. The device further includes a plurality of code transfer elements that are mounted on the housing in alignment with respective ones of the aforementioned lug-receiving openings in the housing. These code transfer elements are each actuatable between a first position and a second position in accordance with the absence or presence of a code lug in the lug-receiving opening, when the tumbler is rotated to the data transfer position. Preferably, the code transfer elements comprise resilient electrically conductive fingers, the configuration of these fingers being such that each element is moved both radially and angularly when engaged by a code lug on a code key inserted in the device.

Yet another principal object of the invention is to provide a new and improved sensing device for sensing code data from individual code transfer elements such as those included in a data transfer device of the kind set forth hereinabove.

A more specific object of the invention is to provide a sensing device which is effective to compensate for bent, misalignment, or otherwise sub-standard contact elements on the data transfer device being sensed.

Another object of the invention is to provide for automatic cleaning of the sensing unit in a tool identification system of the kind described generally hereinabove and to protect the sensing unit against spurious operation which might result from the bridging of individual sensing contact elements.

Accordingly, in a further aspect the invention is directed to a sensing device for sensing the presence or absence of individual code transfer elements on a code unit located at a sensing station in a machine tool. The sensing device comprises a plurality of sensing elements each located at a particular code location. In a preferred construction, these sensing elements constitute elongated electrically conductive sensing brushes. Means are provided for isolating the sensing elements from each other, this means comprising a plurality of insulator guide elements that are interposed between the sensing elements and that project outwardly thereof. The guide elements perform the further function of guiding individual code transfer elements into alignment with the sensing elements. Preferably, further isolation and guide means are provided by individual guide elements that are interposed between the above described guide elements and in alignment with respective ones of the sensing elements. The latter group of guide elements engage the code transfer contact elements to further guide the transfer elements into engagement with the sensing elements.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a perspective view of a code key, constructed in accordance with one embodiment of the present invention, that may be used in the system of FIGS. 1 and 2;

FIG. 4 is a sectional elevation view of an individual identification device, including a code key, employed in the system of FIGS. 1 and 2, constructed in accordance with the invention;

FIG. 5 is a sectional view taken approximately along line 5—5 in FIG. 4;

FIG. 6 is a sectional end elevation view of a sensing device constructed in accordance with the invention and employed in the system of FIGS. 1 and 2;

FIG. 7 is a longitudinal sectional view of the sensing device taken approximately along line 7—7 in FIG. 6;

FIG. 8 is a sectional elevation view of an identification device, similar to FIG. 4, constructed in accordance with another embodiment of the invention;

FIG. 9 is a sectional view taken approximately along line 9—9 in FIG. 8;

FIG. 10 is a plan view of a sensing device used with the identification device of FIG. 8;

FIG. 11 is a partially sectional elevation view taken approximately along line 11—11 in FIG. 10;

FIG. 12 is a detail view taken approximately as indicated by line 12—12 in FIG. 10;

FIG. 13 is a sectional view taken approximately along line 13—13 in FIG. 12;

FIG. 14 is a plan view, drawn to an enlarged scale, of the code key used in the identification device of FIG. 8; and FIG. 15 is a plan view of another form of code member according to the present invention.

Figure 1:
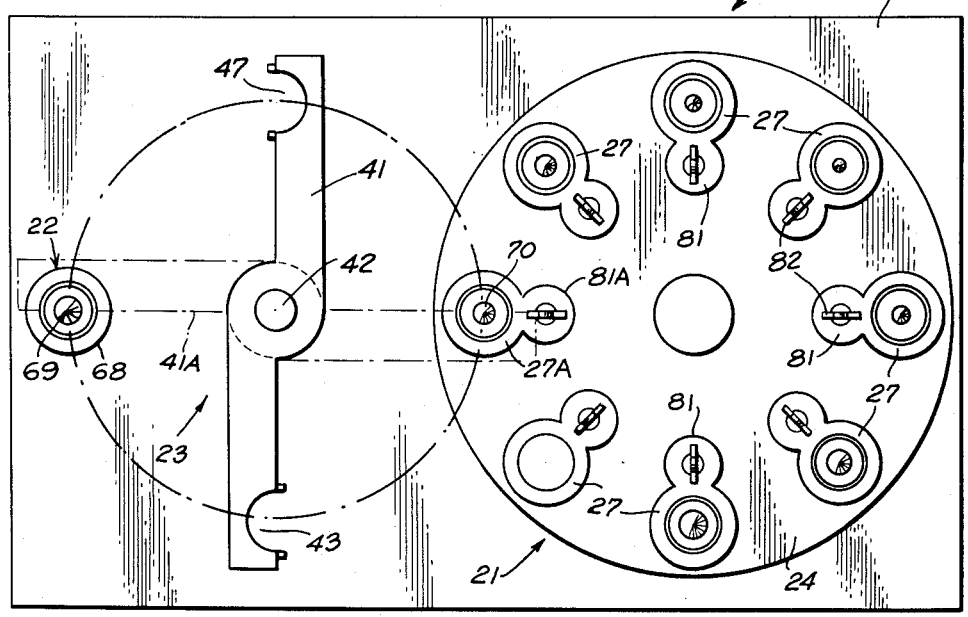
FIG. 1 is a simplified front elevation view of a tool transfer system in which the present invention may be employed.
Figure 2:
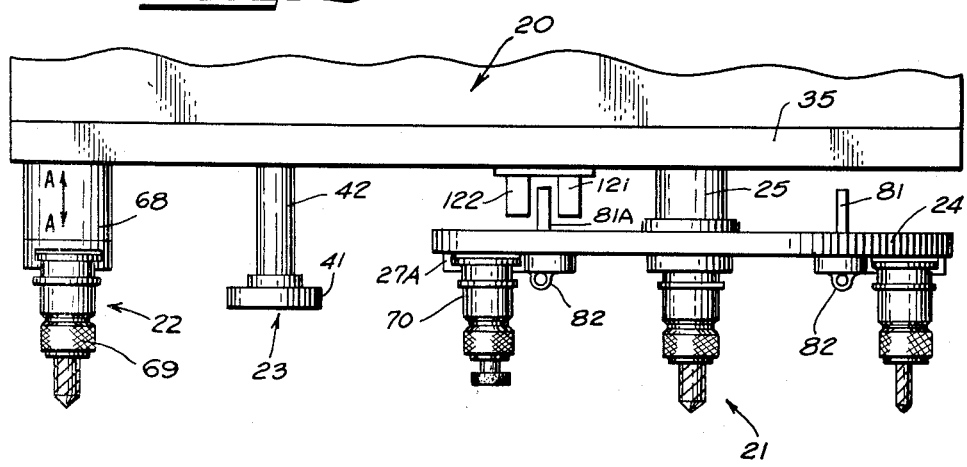
FIG. 2 is a plan view of the tool transfer system illustrated in FIG. 1.

FIGS. 1 and 2 illustrate, in simplified form, a tool transfer system for an automatically controlled machine tool 20. In general, the system comprises a tool storage means 21, a work station 22, and tool transfer means 23 for transferring tools between the work station 22 and the storage station 21. The construction of the work station 22, the transfer mechanism 23, and the individual tool receptacles of the tool storage station 21 are not critical with respect to the present invention; accordingly, these portions of the machine are not described in detail herein.

The tool storage station 21 comprises a tool matrix 24 that is mounted for rotation upon a shaft generally indicated at 25. The tool matrix 24 includes a base plate upon which a plurality of individual toolholder cartridges 27 are mounted. In the illustrated construction, there are eight of the individual toolholder cartridges 27. It should be understood, however, that any desirable number of cartridges or holding devices, comparable to the cartridges 27, may be included in the toolholder matrix 24, depending upon the capacity desired for the machine tool 20. Each of the cartridges includes a suitable clamp or other holding device capable of releasably mounting a toolholder in the matrix 24.

The transfer mechanism 23 comprises a transfer arm 41 mounted for rotation upon a shaft 42. The arm 41 carries a first clamp 43 at one end thereof. A second clamp 47 is included in the transfer arm structure, at the opposite end of the arm, both clamps being shown in open position. The transfer mechanism 23 may further include means (not illustrated) mounted on the transfer arm 41 for latching each of the clamps 43 and 47 in closed position, to hold a toolholder in the clamp. Suitable sensing switches or similar devices may be used to determine the operating condition of the transfer clamps 43 and 47, being mounted on the transfer arm 41.

The work station 22 of the machine illustrated in FIGS. 1 and 2 may be generally conventional in construction. This portion of the system 29 comprises a chuck 68, mounted on a suitable spindle, for mounting a toolholder in working position. A toolholder 69 is shown mounted in the chuck in FIGS. 1 and 2. Means are provided for rotating the spindle and chuck 68 and for moving the chuck axially, in the course of a machining operation, as indicated by the arrows A in FIG. 2. Inasmuch as the mechanism for advancing and retracting the chuck 68 and for driving the chuck and spindle rotationally, during a machining operation, may be conventional and does not comprise a part of the present invention, the details of this mechanism are not illustrated in the drawings. In considering the operation of the system illustrated in FIGS. 1 and 2, it may first be assumed that the transfer arm 41 is located in the "home" position shown in FIG. 1 with both of the jaws 43 and 47 open and empty. Furthermore, it may be assumed that a toolholder 70 is clamped in the cartridge 27A at the transfer location of the storage station 21, and that this particular tool is the one desired for use during the next operating cycle of the machine. In addition, it may be assumed that spindle 68 is in its tool-transfer position. Under these conditions, the transfer arm 41 is rotated in a counterclockwise direction to bring the open jaw 43 into alignment with the toolholder mounted in the receptacle 27A. The position of the transfer arm 41, at this time, is generally indicated by the dash line 41A. As illustrated in FIG. 1, when the transfer arm 41 is in the position 41A, the other clamp 47 on the transfer arm engages the toolholder 69 that is mounted in the spindle chuck 68.

When the transfer arm 41 has been moved to the position 41A, the clamping devices 43 and 47 are actuated to grip the toolholders 70 and 69 respectively. Subsequently, the toolholder 70 is released from the cartridge or clamp 27A; at the same time, the toolholder 69 is released from the chuck 68. To remove the toolholders 69 and 70 from the chuck and from the storage matrix, respectively, it may be necessary to impart some auxiliary motion of the transfer arm 41. Thus, and as in one known system, the transfer arm 41 may be moved outwardly of the storage matrix and the spindle chuck to extract the toolholders from engagement with the spindle chuck and the matrix. On the other hand, a uniplanar system may be utilized if the spindle chuck and the toolholder cartridges in the storage matrix are constructed to afford this kind of operation.

After the toolholders 69 and 70 are released, the transfer arm 41 is rotated further in a counterclockwise direction to a position intermediate the work station 22 and the storage station 21. For example, the arm 41 may be rotated to a position just 180° displaced from the position shown in solid lines in FIG. 1. With the transfer arm 41 in this intermediate position, the storage matrix 24 is rotated to bring the particular toolholder cartridge 27 associated with the toolholder 69 to the transfer location 27A. This is accomplished, in part, by identifying the desired toolholder cartridge by means of the code identification apparatus that comprises the subject matter of the present invention and is described in detail hereinafter. When the desired empty toolholder cartridge is at the transfer location 27A, counterclockwise rotation of the transfer arm 41 is resumed until the transfer arm is at a position displaced 180° from the initial transfer position 41A. This brings the tool 70 into alignment with the spindle chuck 68 and also brings the toolholder 69 into alignment with the cartridge at the storage transfer location 27A. The tool 70 is then disposed in the chuck 68 and the tool 69 is disposed in the storage matrix 24, at the transfer location 27A. This action may entail a return auxiliary movement of the transfer arm 41 toward the storage matrix and the spindle chuck. The clamps 43 and 47 are then released and the transfer arm 41 is returned to its "home" position awaiting the next transfer cycle.

Insofar as the present invention is concerned, it is by no means essential that the transfer mechanism and operating cycle described hereinabove be followed in detail. Instead, the transfer system for the machine tool 20 has been described solely to provide one example of a transfer system in which the invention may be utilized. The identification devices and apparatus of the present invention may also be employed in substantially different transfer systems such, for example, as that set forth in detail in the aforementioned co-pending application of Myron L. Anthony, Serial No. 79,272.

In the operation of the tool transfer system, it is necessary to provide a means for identfying the tools or toolholders to be removed from the tool matrix 24. It is also necessary to provide some means for identifying the position at which a tool that has already been used is to be deposited in the tool storage station. The present invention is directed to identification devices and apparatus used for this purpose.

In addition to tool clamping apparatus, each of the toolholder cartridges 27 of the tool matrix 24 is provided with an individual code key receptacle and data transfer device 81. The construction of an individual code keyholder 81 and of a code key 82 employed in conjunction therewith are shown in FIGS. 3–5. As best shown in FIGS. 3 and 4, the code key 82 employed in this embodiment of the invention is similar to a key of the kind used in conventional tumbler locks, except in the formation and encoding of the key lugs. The key 82 comprises a handle portion 85 and an elongated shank portion 80. The shank portion 80 is provided with a longitudinally crimped or slotted portion affording a longitudinal guide slot 83 used to orient the key in the keyholder 81. A pair of guide lugs 84 are provided at one end of the key adjacent the handle portion 85. The two edges of the key are encoded, in accordance with a predetermined binary code, by means of individual code lugs 86. In the illustrated construction, there are a total of eight code lug positions along each edge of the shank 80 of the key 82, affording a total of sixteen different bits of information in a binary code. This affords a total potential of 65,536 code combinations. Thus, the code key 82 affords a high density coding device, making it possible and practical to utilize a large number of tools in the system. The code lugs are preferably located at equally spaced intervals along the shank of the key, and are all of equal length.

The keyholder 81 and data transfer device, as best illustrated in FIGS. 4 and 5, comprise an elongated cylindrical housing 87. The housing 87 is affixed to a mounting member 88 (FIG. 4) by suitable means, such as a plurality of screws 89. The mounting member 88, in turn, is secured to the matrix 24 as by a plurality of screws 91. The housing 87 is provided with a longitudinal bore 92 within which a tumbler 93 is mounted. The tumbler is held in the housing by suitable means such as a washer 94, a retaining ring 95, and a spring-biased plunger 99. Preferably, means are provided for limiting rotational movement of the tumbler, and may include a pin 96 mounted in the housing 87 in position to engage a suitable stop element in the outer or front portion 97 of the tumbler 93. A suitable set screw or other guide member 98 is mounted in the tumbler 93 in position to engage the guide slot 83 in the key 82, limiting the possibility of insertion of the key into the tumbler to only one fixed orientation.

The tumbler 93 is provided with a pair of longitudinal slots 101 for receiving the key 82. The housing 87 is provided with a similar pair of longitudinal key-receiving slots 102 and with a plurality of radial lug-receiving openings 103 and 104 for receiving the individual lugs 84 and 86 on the key. A first contact or code-transfer assembly 105 is affixed to the housing 87 by suitable means such as a plurality of screws 106. The contact assembly 105 includes a plurality of individual contact fingers 107 which normally project into the lug-receiving openings 103 in the housing 87 as indicated by the finger 107A in the opening 103A in FIG. 4. A second contact assembly 108 is secured to the housing 87 by suitable means such as a plurality of screws 109 (see FIG. 5). The contact assembly 108 includes a plurality of individual contact fingers 111 which project into the code lug openings 104 on the opposite side of the housing. When the key 82 is inserted in the keyholder 81, it is inserted with the key aligned in a horizontal direction, as seen in FIG. 5, and the key is then turned 90° in a clockwise direction to the position illustrated in FIG. 5. When this is done, those contact fingers 107 and 111 which are engaged by the code lugs are pushed outwardly from the housing 87 to the position illustrated for the contact finger 107 in FIG. 5. The contact fingers 107 and 111 which are not engaged by the code lugs remain in their normal or depressed position and project only slightly outwardly of the housing 87, as shown by the contact finger 111 in FIG. 5.

As noted hereinabove, each of the toolholder cartridges 27 (FIG. 1) is provided with a key receptacle or holder 81 for use with one of the keys 82. Coding of the blank keys 82 may be effected simply and inexpensively, using an ordinary key punch, to afford a high-density code member identifying one of thousands of tools. Code keys are fabricated at the toolroom, preferably at the same time that the tool for a given part of a job is set up in its toolholder, and may subsequently be checked by the toolroom operator, the machine operator, and by inspectors.

To set up the matrix 24 for a given job, all of the tools, mounted in their respective toolholders and each accompanied by the required code member 82, are delivered to the machine operator. Each tool is then loaded into one of the cartridges 27 and the corresponding code key 82 is inserted in the holder 81 associated with the matrix position at which the tool is mounted. It is not necessary for the machine operator to locate specific tools at any given cartridge position in the matrix 24, since the individual code keys 82 afford full identification of the tool mounted at any matrix position.

The tool transfer system illustrated in FIG. 2 includes a pair of sensing devices 121 and 122 for reading the code data from each code transfer device 81 whenever that device is brought into the position indicated by the keyholder and transfer device 81A. The sensing devices 121 and 122 are essentially similar to each other and are mounted upon the frame 35 of the machine 20 in position to engage the contact fingers of the code units 81 as the latter are brought to the transfer positions; the sensing unit 121 is shown in detail in FIGS. 6 and 7.

The sensing device 121, as illustrated in FIGS. 6 and 7, comprises a housing 126 having a pair of mounting blocks 127 and 128 affixed thereto. The housing is secured to the frame member 35 by suitable means such as the screws 129. A plurality of electrically conductive sensing elements or brushes 131 are mounted within the housing 126 between the mounting blocks 127 and 128, being supported therein by means of a plurality of insulating spacers 132. The spacers 132 are supported upon a pair of mounting bolts 133. Individual electrical connections are provided to the sensing brushes 131, being generally indicated by a connecting cable 134. The relative positions of the keyholder and data transfer device 81 and the sensing unit 121 are illustrated in FIGS. 6 and 7; as indicated therein, the brushes 131 engage the periphery of the keyholder and specifically the individual contact elements 107 thereof. The number of sensing elements 131 corresponds to the number of contact elements 107 on one side of the code unit 81. The second sensing unit 122 at the transfer station of the matrix (see FIG. 2) is used to sense the contact elements 111 on the opposite side of the key unit. It is thus seen that the sensing devices 121, 122 are effective to sense the complete identification data carried by a code key 82 in any of the code units 81 when located at the transfer position of the tool storage matrix 24.

FIGS. 8-14 illustrate further embodiments of the present invention comprising a code key receptacle and data transfer device 181 (FIGS. 8–11), a code key 182 (FIGS. 8, 9 and 14) and a pair of sensing devices 221 and 222 (FIGS. 10–13). These devices represent a preferred construction for the present invention and include a number of features affording advantages not provided by the specific devices described hereinabove.

The blank code key 182 utilized in this embodiment of the invention is substantially similar to the key 82 described hereinabove. It comprises a handle portion 185 and an elongated shank portion 180. As before, the shank portion 180 of the key is crimped or otherwise formed to afford a longitudinal guide slot 183 that is utilized to orient the key in the keyholder 181. The two edges of the key are encoded by means of code lugs 186 that project outwardly of the shank portion of the key at predetermined spaced locations along the shank. In this key there are a total of twenty code lugs positions (see FIG. 14) affording a total of twenty different bits of information in a binary code. This permits a total potential of 1,049,576 code combinations. As before, the code lugs 186 are located at equally spaced intervals along the shank 180 of the key, and all are of equal length. The code lugs 186 may be formed with pre-scored or otherwise weakened sections at their bases, as indicated at 190 in FIG. 14, to facilitate lug removal in encoding of the keys.

In the code key 182, the code lugs are divided into individual groups to facilitate encoding of the key by the punching out of selected lugs. Thus, the first four code lug positions, two on each side of the key, comprise the code lug grouping 186A, which is separated from the next grouping 186B by an indicating line 281 that is stamped or otherwise impressed in the code key. Furthermore, each of the code lugs in the group 186A is impressed with a symbol indicating the code significance of that particular lug. Assuming a conventional unmodified binary code, the lugs may be impressed with the numerals one, two, four and eight to indicate the four levels of a four-bit binary code. A similar technique is followed with respect to the four code lugs in the group 186B, which is separated from the next code lug group 186C by the stamped line 282. A consistent indicator system is followed throughout the length of the key, making it possible to encode the key with any particular code value in a ready and convenient manner.

As before, the code key 182 is preferably provided with a pair of guide lugs 184 to prevent turning of the key until it has been inserted completely into the keyholder and receptacle 181.

The construction of the code key receptacle and data transfer device 181 is best illustrated in FIGS. 8 and 9. As shown therein, the device 181 comprises an elongated cylindrical housing 187 having a mounting flange 188 that affords a convenient means for mounting the housing in a tool matrix. The housing 187 is provided with a longitudinal bore within which a tumbler 193 is mounted. The tumbler 193 is held in the housing 187 by means of a washer 194 and a retaining ring 195. A spring biased plunger 199 is mounted within the recess in the housing 187 and is utilized to bias the tumbler 193 into engagement with the retaining ring 195. As in the previously described construction, a stop pin 196 is mounted in the housing flange portion 188 in position to engage a shoulder on an outer flange 197 of the tumbler 193. The pin 196 serves to limit the tumbler 193 to approximately 90° rotational movement within the housing 197. A guide member comprising a set screw 198 is mounted in the tumbler 193 and projects into the internal bore of the tumbler in position to engage a guide slot 183 in the key 182 to determine the initial orientation of the key within the tumbler.

As in the previously described construction, the tumbler 193 is provided with a pair of longitudinal slots for receiving the key 182. The housing 187 is provided with a similar pair of longitudinal slots 202 which can be aligned with the tumbler slots by rotation of the tumbler to the position illustrated in FIG. 9, permitting insertion of the key 182 regardless of the number of code lugs on the key. Furthermore, the housing 187 includes a plurality of radial lug-receiving openings 203 and 204, diametrically opposed to each other, for receiving the individual lugs 184 and 186 on the key 182. Similar lug openings are provided, in the housing, for the guide lugs 184. A first code transfer assembly 205 is affixed to the housing 187 by suitable means such as a clamp bar 206 and a plurality of mounting screws. The code transfer or contact assembly 205 includes a plurality of code transfer elements in the form of individual contact fingers 207. Each of the fingers 207 extends through one of the housing openings 203 and projects outwardly thereof to a limited extent, terminating in a rounded contact portion 207A. The contact assembly 205 may be formed from any suitable resilient conductive material. It should be noted that the configuration of the contact finger or element 207 is substantially different from the corresponding contact finger 107 in the first-described embodiment, as may be seen by a comparison of FIGS. 5 and 9. This difference in configuration makes for a substantial difference in operation as explained in detail hereinafter.

A second contact assembly 208 is mounted on the housing 187 in diametrically opposed relation to the contact assembly 205, being secured to the housing by means of a clamp bar 209 and a plurality of suitable fastening devices such as the illustrated screws. The contact assembly 208 includes a plurality of individual contact fingers 211 which are similar in configuration to the contact fingers 207 in the assembly 205. Each of the contact fingers 211 extends through and projects outwardly of one of the lug-receiving slots 204 in the housing 187, terminating in a rounded contact portion 211A.

The operation of the data transfer device 181 can best be understood by comparison of the sectional view of FIG. 9 with the similar sectional representation of the device in FIG. 11. In FIG. 9, the tumbler 193 is shown with its two longitudinal key-receiving slots aligned with the housing slots 202 to receive the key 182. This is the position of the tumbler of the transfer device 181 at the time the key is inserted. After insertion of the key, the key is rotated in a clockwise direction through an angle of 90° to the position illustrated in FIG. 11, the rotational movement of the tumbler being limited by engagement of the pin 196 with the flange portion 197 of the tumbler (see FIG. 8). As can be seen by a comparison of FIGS. 9 and 11, each of the key code lugs 186 that engages one of the contact fingers 207 moves the contact finger outwardly of the housing 187 and also effects a rotational movement of the contact portion 207A of the contact finger. That is, the contact portion 207A of the contact finger is effectively displaced angularly as well as radially relative to the axis of the device 181. The same thing is true with respect to the contact fingers 211. That is, the contact portion 211A of each of these contact elements is moved outwardly of its slot 204, when engaged by one of the lugs 186, and is also displaced angularly with respect to the stationary portions of the data transfer device 181. Of course, the contact fingers 207 and 211 that are aligned with code positions on the key 182 where the code lug has been cut away, in the encoding of the key, remain in the initial or unactuated positions illustrated in FIG. 9 even though the key and tumbler are rotated from the position shown in that figure to the position of FIG. 11.

The two sensing devices 221 and 222 are essentially similar in construction to each other but are modified, as compared with the device 121 described hereinabove, to afford improved accuracy and effectiveness in operation. As shown in FIGS. 10–13, the sensing device 221 comprises a channel-shaped housing 226 terminating at one end in a pair of mounting brackets 227 that are used to mount the sensing device 221 on a base plate 223 that also carries the other sensing unit 222. The housing is secured to the base plate 223 by suitable means such as the screws 224 (FIGS. 10 and 11).

Within the housing 226, a plurality of electrically conductive sensing elements or brushes 231 are mounted in positions of the keys 182 and the data transfer units 181. Each of the brushes 231 is mounted within a generally C-shaped insulator member 232 as best illustrated in FIG. 13. The insulator members 232 are mounted upon a pair of mounting bolts 233 that extend longitudinally of the housing 226. A plurality of insulator spacers 234 are intersperced with the insulator members 232, one of the insulating spacers 234 being disposed between each adjacent pair of the spacers 232 and, accordingly, extending between each adjacent pair of brushes 231. It is thus seen that the insulator elements 232 and 234 are effective to isolate the individual brushes or sensing elements 231 from each other.

In the construction illustrated in FIGS. 10–13, the insulator elements 232 and 234 perform an additional and important function. Each of the intermediate insulator spacers 234 extends outwardly of the brushes 231. The ends of the extension portions of the members 234 are tapered, as best shown in FIG. 12, so that each pair of the insulator spacers 234 defines two V-shaped channels 235 extending inwardly toward one of the brushes 231. Similarly, the outer surface of each of the insulator members 232 is tapered as best shown in FIG. 13. Thus, the insulator members are utilized to provide guide channels that are effective to guide the individual code transfer elements 207 into positive engagement with the sensing brushes 231. Consequently, positive contact is assured between the code transfer contact elements 207 and the sensing brushes; at the same time, the contacts themselves provide an effective cleaning action as they move through the guide channels afforded by the insulator guide elements 234. Any bent or otherwise misaligned guide elements are positively channeled into engagement with the sensing brushes.

The brushes 231, in this embodiment, are each relatively elongated, in the direction of movement of the code transfer unit 181 through the sensing position (see FIGS. 11 and 13). The use of relatively long sensing elements is also effective to compensate for minor variations in the configuration of the code transfer contacts, the springs 207. Furthermore, by utilizing elongated brushes of the kind illustrated in FIGS. 11–13, it is possible to perform a sensing operation while the tool matrix is moving and to avoid critical tolerance limitation with respect to the positioning of the matrix for a sensing operation.

The mounting of the brushes 231 in the sensing unit 221 is relatively simple. As illustrated in FIG. 13, each of the brushes is electrically and mechanically connected to a relatively short wire 237 that extends upwardly through a small hole in the bight portion of the associated insulator spacer 232 and through a hole in a reversely bent spring 238, the other end of the wire 237 being secured to one end of the spring 238. The spring 238 is utilized to provide an electrical connection to the brush, being extended outwardly of the housing 226 as indicated by the reference numeral 229. Of course, means must be provided to insulate each of the springs 238 from the housing 226 if, as is usually the case, a conductive housing is employed.

As noted hereinabove, the spring elements 207, and particularly the contact portions 207A thereof, are moved both radially and angularly when engaged by one of the code lugs 186 on the code key. The angular displacement of the contact fingers is of substantial importance because it prevents false actuation that could occur if the springs 207 were bent outwardly of the code unit 181 beyond the normal positions illustrated in FIG. 9. Thus, even if one of the unactuated code fingers 207 projects outwardly of the housing 187 of the transfer unit 181 well beyond the position shown in FIG. 9, it would not make contact with the sensing elements of the sensing device 221 because the contact portion 207A would not be in the necessary angular orientation relative to the sensing brushes 231. For this reason, and despite the fact that relatively long sensing brushes are employed, substantial malformation of the spring fingers 207 can be tolerated without resulting in spurious operation of the sensing apparatus of the invention.

In the foregoing description of the code members 82 and 182, the implicit assumption has been that the code lugs constitute the individual code indicators for identifying particular tools. This is of course correct; on the other hand, the absence of a code lug is equally significant insofar as tool identification is concerned. That is, the removal of a code lug, and the resulting aperture or discontinuity where a lug would otherwise be present, is as much a part of the code identification as the positive presence of a physical member or lug. Thus, it may be considered that the code indicator portions or elements of each of the code keys described hereinabove comprise either the lugs themselves or the gaps caused by removal of the lugs, either basis of analysis being equally valid.

FIG. 15 illustrates another form of code member which may be utilized in a machine tool identification system according to the present invention. The code member 382 illustrated in FIG. 15 comprises a handle portion 385 and a code portion 380. In the construction of the code member 382, code data indications are provided by means of a plurality of slots or apertures formed in the opposite edges of the code member. Thus, in the relatively simple device illustrated in FIG. 15, there are just two code apertures or slots 386 that are provided in the shank portion 380 of the code member 382. Alternate code indicator locations are illustrated by the dash outline 387. That is, further code indicator slots or apertures may be punched or otherwise formed in the code member 382 at these locations to afford additional identification slots such as the apertures 386. Typically, the code member 382 may be formed from relatively rigid metal or plastic and the code indicator apertures 386 may be fabricated by suitable punch means. Since the code apertures locations are not positively identified by the physical contour or dimensions of the blank code member, it may be desirable to afford locating apertures such as the apertures 388 to permit accurate location of the code indicator slots 386 at predetermined positions along the code member 382 to correspond to a predetermined position code.

Like the code members described hereinabove, and particularly in connection with FIGS. 3, 4, 8 and 14, it is necessary to afford some means for orienting the code member 382 in a transfer receptacle. Thus, for example, accurate orientation may be afforded by an off-center guide slot 389 at one end of the code member; this guide slot would be engaged by a suitable guide member or projection at the inner end of a cooperating data transfer receptacle. Of course, it is still desirable to provide some means for making sure that the code member is inserted completely into the receptacle. This can be accomplished by suitable means such as the guide slots 391 near the handle portion 385 of the code member 382. The code member 382 can be utilized with a receptacle essentially similar to those described hereinabove in connection with FIGS. 4 and 5 and FIGS. 8–11, provided the housings of the receptacles permit the use of the wider intermediate portions occurring between adjacent code indicator slots 386. That is, the basic construction of the transfer receptacles may be substantially similar except for the minor modifications required to afford operation in response to a code member which is indented or slotted in accordance with predetermined code data rather than having projections or lugs at the code positions. Of course, the slots 386 could also be located internally of the code member instead of at the opposed edges thereof, although this might complicate the construction of the transfer receptacles to some extent.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. Tool identification apparatus for a machine tool, comprising: a plurality of individual tool identification members each having a plurality of code lugs, at preselected locations, to identify an individual tool in accordance with a predetermined binary position code, said members each including an orientation guide; a plurality of data transfer receptacles for receiving said tool identification members and each including a plurality of resilient electrically conductive code transfer elements each actuatable angularly and radially relative to a common axis from a first position to a second position in response to the presence or absence of a code lug at a given code position on a tool identification member inserted therein, said receptacles each further including orientation means for engaging the orientation guide on an identification member to orient that member in the receptacle; and a sensing device, for sensing said code transfer elements on any of said transfer receptacles, including a plurality of individual electrically conductive sensing elements aligned with said transfer elements, but isolated electrically from each other.

2. Tool identification apparatus for a machine tool, comprising: a plurality of individual tool identification members each having a plurality of code indicator apertures formed therein, at preselected locations, to identify an individual tool in accordance with a predetermined binary position code, said members each including an orientation guide; a plurality of data transfer receptacles for receiving said tool identification members and each including a plurality of resilient electrically conductive code transfer elements each actuatable angularly and radially relative to a common axis from a first position to a second position in response to the presence or absence of a code indicator aperture at a given code position on a tool identification member inserted therein, said receptacles each further including orientation means for engaging the orientation guide on an identification member to orient that member in the receptacle; and a sensing device, for sensing said code transfer elements on any of said transfer receptacles, including a plurality of individual electrically conductive sensing elements aligned with said transfer elements, but electrically isolated from each other.

3. Tool identification apparatus for a machine tool, comprising: a plurality of individual code keys each having a handle portion and an elongated shank portion and having a plurality of code lugs of equal length projecting outwardly of said shank portion at selected ones of a series of predetermined binary code locations; a plurality of key receptacle and data transfer devices each including an elongated cylindrical housing having radial lug-receiving openings corresponding to said key code locations, guide means for orienting a key within said housing and a plurality of resilient electrically conductive code transfer elements mounted on said housing in alignment with said lug-receiving openings and each actuatable outwardly of the housing and angularly relative thereto from a first position to a second position in the presence of a code lug in the lug-receiving opening; and a sensing device, for sensing said code transfer elements, including a plurality of individual elongated conductive sensing elements aligned with said transfer elements, and a plurality of insulator guide elements interposed between said sensing elements and affording extended V-shaped channels at either end of each sensing element to guide a code transfer element into engagement therewith.

4. In a tool identification system for a machine tool, a code key receptacle and data transfer device comprsing: an elongated cylindrical housing having a plurality of radial lug-receiving openings at predetermined spaced code locations along said housing; orienting means, mounted within said housing, for orienting a code key therein with individual lugs projecting into said lug-receiving openings; and a plurality of electrical contact elements, comprising individual spring fingers, mounted on said housing and each aligned with a respective one of said lug-receiving openings in position for engagement by a code lug on a code key inserted in said housing, said contact elements each being radially and angularly movable between a first position and a second position in accordance with the presence or absence of a code lug in the lug-receiving opening upon rotation of a key, within said housing, to a given data transfer position.

5. In a tool identification system for a machine tool, a sensing device for sensing the presence of individual code transfer contact elements at a plurality of spaced code locations at a sensing station, comprising: a plurality of sensing contact elements each located at a respective one of said code locations; electrical insulator means for electrically isolating said sensing elements from each other, including a first plurality of insulator guide elements, interposed between said sensing elements and projecting outwardly thereof, for guiding the individual code transfer contact elements, into alignment with the sensing elements; and a second plurality of insulator guide elements, individually interposed between said first guide elements in alignment with respective ones of said sensing contact elements, for initially engaging said code transfer contact elements to guide them into engagement with said sensing elements.

References Cited by the Examiner

UNITED STATES PATENTS

| | | | |
|---|---|---|---|
| 2,005,497 | 6/35 | Falk. | |
| 2,105,304 | 1/38 | Wagner | 200—44 |
| 2,313,170 | 3/43 | Pierce | 200—44 |
| 2,344,234 | 3/44 | Cooper | 200—44 |
| 2,637,844 | 5/53 | Thompson | 200—42 |
| 2,668,890 | 2/54 | Latour | 200—144 |

OTHER REFERENCES

Yale and Towne Manufacturing Co. Catallogue, No. 26, copyright 1929, chapter, "Padlocks," p. 24.

BERNARD A. GILHEANY, *Primary Examiner.*

WALTER STOLWEIN, ROBERT K. SCHAEFER,
*Examiners.*

UNITED STATES PATENT OFFICE
CERTIFICATE OF CORRECTION

Patent No. 3,187,123                                        June 1, 1965

Myron L. Anthony

It is hereby certified that error appears in the above numbered patent requiring correction and that the said Letters Patent should read as corrected below.

Column 11, line 36, for "isolated electrically" read -- electrically isolated --; column 12, line 17, for "comprsing" read -- comprising --.

Signed and sealed this 23rd day of November 1965.

(SEAL)
Attest:

ERNEST W. SWIDER                                    EDWARD J. BRENNER
Attesting Officer                                        Commissioner of Patents